United States Patent [19]
Hattori et al.

[11] 3,887,885
[45] June 3, 1975

[54] ELECTROOPTIC MODULATOR

[75] Inventors: Shuzo Hattori; Tadao Hiramatsu, both of Nagoya, Japan

[73] Assignee: Hagiwara Denki Kabushiki Kaisha, Nagoya, Japan

[22] Filed: Nov. 28, 1973

[21] Appl. No.: 419,869

[30] Foreign Application Priority Data
Dec. 4, 1972  Japan.......................... 47-121353

[52] U.S. Cl........ 332/7.51; 331/94.5 M; 350/160 R
[51] Int. Cl............................................. H01s 3/10
[58] Field of Search.. 332/7.51; 350/96 WG, 160 R; 331/94.5 M

[56] References Cited
UNITED STATES PATENTS
3,726,585  4/1973  Fedotowsky et al.............. 332/7.51

OTHER PUBLICATIONS
Kaminau et al., "Electrooptic Light Modulators," 10/66, pp. 1374-1390, Proceeding of IEEE, Vol. 54, No. 10, JK-5700-5777.

Primary Examiner—Maynard R. Wilbur
Assistant Examiner—N. Moskowitz
Attorney, Agent, or Firm—Moonray Kojima

[57] ABSTRACT

An electrooptic crystal is provided, on its one surface of $Y - z$ plane, interdigital electrodes extending in y-direction and spaced apart from one to another in z-direction. To the electrode pair is applied a modulating signal voltage to form an electrostatic field which is spatially periodic in z-direction having an intensity proportional to the modulating signal voltage and uniform in y-direction subjacent the electroded surface. A coherent light beam is projected into the crystal from one of the $x - z$ plane. The light beam propagates in the crystal subjacent the electroded surface and totally reflected at the surface at the center position of the y-direction length of the crystal to pass as long way as possible through the crystal portion where the effective electrostatic field exists. From the other of the $x - z$ plane come out light beams directing in separate directions. A slit permits one of the out-coming light to come out whose intensity is varied in accordance with the modulating signal voltage.

8 Claims, 6 Drawing Figures

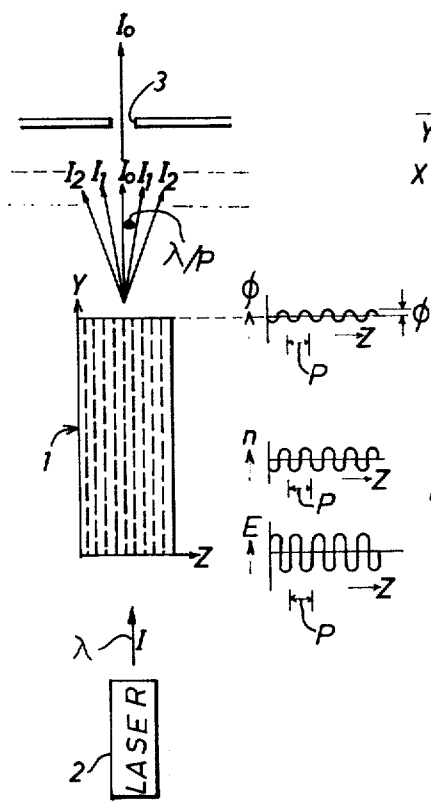
Fig.1
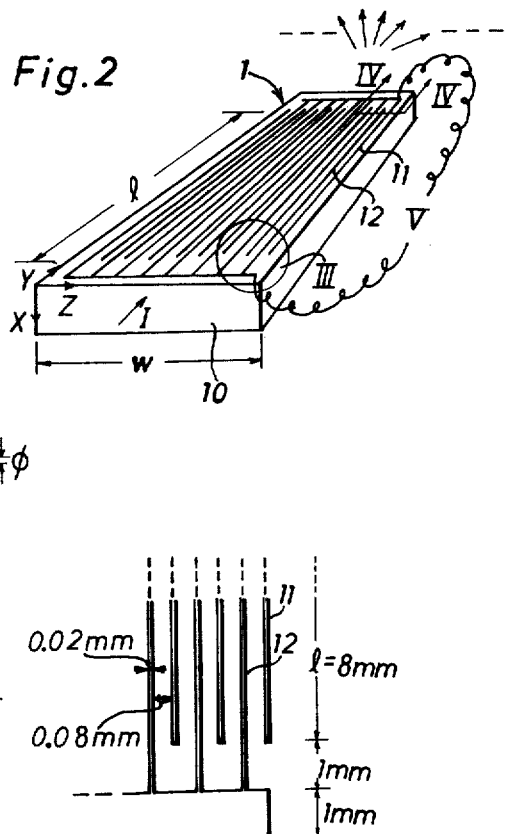
Fig.2
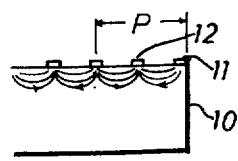
Fig.3
Fig.4

ELECTROOPTIC MODULATOR

BACKGROUND OF THE INVENTION

This invention relates generally to the modulation of electromagnetic energy at frequencies including that of visible and near infrared spectrum. The ultimate objective of the electrooptic modulator is the use of such electromagnetic wave in high speed communication systems where the desirable modulator has a broad frequency band up to gigahertz and gives a considerable modulation with modulation powers sufficiently small to admit the use of semiconductor circuitry.

The modulation signals may be given in the form of the continuous wave or the pulsed wave. In the former case an additional desideratum to the modulator is the stability of the bias voltage which gives the least distortion to the wave form. In the latter case an additional desideratum to the modulator is the high extinction ratio which vouches a safer operation of the digital signal processing at the receiving end of the communication systems.

In the prior arts of such modulators one of the most successful one is the transverse field modulator using a y-axis bar of a lithium tantalate crystal invented by A.A. Ballman, et al., in U.S. Pat. No. 3,506,929, patented Apr. 14, 1970. A brief description of the transverse field electrooptic modulator is as follows:

In a parallelepiped electrooptic crystal having crosssection $w \times d$ and length $l$ the electrooptically induced change of the birefringence from the electrostatic field formed in the crystal by a modulation voltage V across the thickness $d$ of the crystal gives rise to the change of the phase retardation between two components of polarization, one is parallel to and the other is perpendicular to the electrostatic field of the electromagnetic wave propagated through the crystal along the axis of the parallelepipe.

Provided the plane of polarization at the entrance to the crystal is inclined 45° to the side $d$, and a polarized component of the electromagnetic wave that is parallel or perpendicular to the original one is selected by a polarizer at the exit from the crystal, the output power of the electromagnetic wave I changes as:

$$I = I_0 \tfrac{1}{2}[1 + \sin\{2(V - V_b)/V_{eff}\}], \quad (1)$$

where $V_b$ is the bias voltage which gives a circularly polarized wave at the exit from the crystal and $V_{eff}$ is the effective full modulation voltage defined as (the input power) over (the maximum slope in the curve of the output power versus the modulation voltage). In the case of the transverse field modulator using crystals of $3m$ symmetry the modulation voltage is expressed as follows:

$$(V_{eff})_{tr} = (2/\pi)V_{\lambda/2}(d/l) \; ; \; V_{\lambda/2} = \lambda/(n_e{}^3 r_{33} - n_0{}^3 r_{13}). \quad (2)$$

For a modulation signal voltage $v$ of continuous wave form and pulsed wave form modulation voltage $V$ is chosen as:

$$V = V_b{}^* + v \quad (3a)$$

and $$V = V_b{}^* - (\pi/4)V_{eff} + v \quad (3b)$$

respectively. $V_b{}^*$ is the initial value of the bias voltage $V_b$, however it changes sensitively with a change of the ambient temperature as a result of the change of the natural birefringence. In the case of the continuous wave form, the change of the bias voltage $V_b$ from $V_b{}^*$ gives rise to a shift from the condition of the least distortion of the wave form. In the case of the pulsed wave form, the change of the bias voltage causes a deterioration of the extinction ratio.

The electrode capacitance of the transverse field modulator having dimensions given before is:

$$(C)_{tr} = C_0(wl/d) \; ; \; C_0 = (\epsilon_r \times 10^{-9}/36\pi) \quad (4)$$

Thus the modulation power for a given upper frequency limit $f_c$ and a modulation efficiency $\chi$ is given as:

$$(P)_{tr} = \pi f_c C V_{eff}{}^2 (\chi/2)^2 = \pi f_c C_0 (2/\pi)^2 (V_{\lambda/2})^2 (\chi/2)^2 (wd/l) \quad (5)$$

According to the article by I. P. Kaminov and E. H. Turner (Proc. IEEE, vol. 54 No. 10, 1966 pp. 1,374–1,390), diffraction limited value of $(wd/l)$ is given as $(4\lambda/\pi n)$ considering the Gaussian beam. However this factor $(wd/l)$ is limited practically by the difficulty of aligning the modulator to the axis of incident light beam and by the technology to fabricate an electrooptic crystal to the desired dimensions. An example of the lithium tantalate transverse field modulator referred before, in which $w = d = 0.25$mm and $l = 10$mm, corresponds to the safty factor $S^2$ of 7.75 in the following expression:

$$(wd/l) = S^2(4\lambda/\pi n) \quad (6)$$

The same example gave $(V_{eff})_{tr}$ of 48 volts and $(C)_{tr}$ of 3.8 pF and thus gave the modulation power of 280 milliwatts for $f_c$ of 1 gigahertz and $\chi$ of 0.2. This value of modulation power is tolerable but unsatisfactory for the use of semiconductor circuitry.

The present invention relates particularly to the modulation of the electromagnetic energy using the diffraction effect caused by a spatially periodical variation of the phase of the electromagnetic wave. The variation of the phase is caused by the propagation of the wave in some length through an electrooptic crystalline medium whose refractive index is spatially varied in the direction perpendicular to that of the propagation of the electromagnetic wave, the refractive index being inversely proportional to the propagation speed of the wave.

The concept of the diffraction modulation is proposed by several authors (see for example: M. A. R. P. Barrows and M. G. F. Wilson; Electronics Letters vol. 7, No. 10, 1971, pp. 267–269). The amplitude of the periodic phase modulation after the propagation through the $3m$ electrooptic crystal of a length $l$ is given by:

$$\phi = \pi (V_{\lambda/2}')^{-1} \int_0^l E(s) ds \; ; \; V_{\lambda/2}' = \lambda/(n_e{}^3 r_{33}), \quad (7)$$

where $E(s)$ is the amplitude of the periodical variation in z-direction of the z-component of the electrostatic field which is responsive to the spatial modulation of the diffractive index of the electrooptic crystal. The character $s$ is the length measured along the path of the propagation of the electromagnetic beam in an $(x, y)$ plane. The periodically phase varied electromagnetic beam at the exit of the crystal is reconstructed as the superposition of homogeneous component plane waves. The $m$-th order component wave has a direction of propagation in an angle $\frac{1}{4}_m$ to that of the incident wave given as:

$$\theta_m = m\lambda/p, \qquad (8)$$

where $p$ is the pitch of the periodical electrostatic field toward $z$-direction. The intensity of the $m$-th order component wave is given as:

$$I_m = I J_m^2(\phi), \qquad (9)$$

where $J_m$ is the $m$-th order Bessel function. None of prior authors stated about the resource how to couple the incident electromagnetic beam to the periodic electrostatic field.

SUMMARY OF THE INVENTION

The present invention is based on the discovery of an effective and stable method for coupling the incident electromagnetic beam to the periodic electrostatic field. The periodic electrostatic field having a pitch $p$ toward $z$-direction is easily produced by means of so-called interdigital electrodes having the same pair-pitch $p$. These electrodes are usually photo-lithographically engraved from a metal layer on a surface of an electrooptic crystal. The electrostatic field inside the surface is expressed as:

$$E(x, z) = k(\delta)(V/p)exp(-2\pi x/p)\sin(2\pi z/p), \qquad (10)$$

where $k(\delta)$ is a nondimensional factor dependent on the ratio of the inter-electrode space to the electroded-width $\delta$. The character $k(\delta)$ for a large $\delta$ is known to be $8/\pi$ by our approximate theory. As is seen from Eq. (8), $p$ must be a few tenths of $mm$ to obtain a considerable separation between diffracted component waves. Thus, the periodic electrostatic field given by Eq. (10) is confined in a very thin layer just inside the electroded surface.

This explains the reason why prior authors failed to define the method of coupling the electromagnetic beam to the field. This difficulty is overcome by so adjusting the angle of incidence of the electromagnetic beam that the beam is total-internally reflected back from the electroded surface with a very small angle $\alpha$ to the surface. In this scheme of the coupling, the coupling integral is given as:

$$\int_0^1 E(s)ds = k(\delta)(V/p)\int_{-y/2}^{y/2} \exp(-2\pi\alpha|y|/p)dy$$

$$\doteq k(\delta)(V/p)(p/\pi\alpha) \qquad (11)$$

Thus, from Eq. (7) the amplitude of the spatial periodic phase modulation $\phi$ is given as:

$$\phi = (V_{\lambda/2}')^{-1}k(\delta)(V/\alpha) \qquad (12)$$

The effective full modulation voltage about the zero-th component of diffraction is given as:

$$(V_{eff})_{dif} = (1/0.678)(k(\delta))^{-1}V_{\lambda/2}'\alpha \qquad (2a)$$

where the factor 0.678 is the first maximum of $(d/d\phi)$ $(J_0^2(\phi))$ at $\phi=1.084$. In the meanwhile, the capacitance of the interdigital electrode is given as:

$$(C)_{dif} = C_0 k'(\delta)(w \cdot l/p) \qquad (4a)$$

where $k'(\delta)$ for a large $\delta$ is known to be 0.543 by our approximate theory. Finally the modulation power for a given $f_c$ and $\chi$ is given as:

$$(P)_{dif} = \pi f_c C_0 k'(\delta)(0.678k(\delta))^{-2}(V_{\lambda/2}')^2(\alpha^2 w \cdot l/p). \qquad (5a)$$

Again the factor $(\alpha^2 w \cdot l/p)$ is expressed as:

$$(\alpha^2 w \cdot l/p) = S_1 S_2 (4/\pi)^2 (\lambda/n_e) \qquad (6a)$$

In Eq. (6a) $S_1=1$ gives the limiting value of $w$, width of the beam between its $1/e^2$ power points, namely:

$$w = S_1(4/\pi)p \qquad (6b)$$

$S_2=1$ gives the limiting value of $\alpha$, that gives the inclination of the Gaussian beam which is reflected at the center of the coupling length $l_c$ and the $1/e^2$ power point of which lies in-between the surface and the $1/e^2$ intensity point of the surface electrostatic field at the both end of the coupling length $l_c$, namely:

$$\alpha^2 l = S_2(4/\pi)(\lambda/n_e) \qquad (6c)$$

Comparing Eq. (5a) with Eq. (5), $(P)_{dif}$ is considerably smaller than $(P)_{tr}$ because of the factor $k'(\delta)$, $(0.678k(\delta))^{-1}$ over $(2/\pi)$, and $V_{\lambda/2}'$ over $V_{\lambda/2}$ which are 0.543, 0.910 and 0.774 respectively. Therefore, the present invention, that is essentially a diffraction modulator using the total-internal reflection of the incident beam as the coupling scheme to the periodic surface field carrying the modulation signal, enables to reduce the modulation power for the continuous wave form considerably. The bias voltage, which gives the least distortion of the wave form, is not sensitive to the change of the ambient temperature. The bias voltage is determined from Eq. (12) by putting $\phi=1.084$.

Accordingly, we can see the bias voltage depends solely on $V_{\lambda/2}'$ which has slack dependence on the ambient temperature. We can choose dimensions of the modulation crystal so as to facilitate the fabrication of the crystal. Because all parameters having essential bearing on the modulation effect, $w$, $l$, $p$, $\delta$ and $\alpha$, are related to dimensions of the interdigital electrode and the relative position of the modulation crystal to the incident optics and dimensions of the modulation crystal itself are nothing to do with the effect.

Moreover, the present invention enables to reduce the cost of the modulator considerably in comparison with that of the transverse field modulator by precluding the necessity of expensive optical components such as the analyser.

For the purpose of the modulation by pulsed wave form, it is appropriate to use the first order component of diffraction. With a proper choice of an output focusing optics and an output slit, and with necessary reduction of the imperfection in the pitch of the interdigital electrodes, the leakage output in the absence of the modulation voltage can be reduced to a fairly small value. That is, it results in a large extinction ratio which is mechanically stable and insensitive to the temperature variation.

BRIEF DESCRIPTION OF THE DRAWINGS

Additional objects and advantages of the present invention will be more readily apparent from the following detailed description of preferred embodiments thereof when taken together with the accompanying drawings in which:

FIG. 1 is a schematic view which explains fundamental functions in a general electrooptic diffraction modulator;

FIG. 2 is a perspective view of a schematic representation of an example of the modulation unit of the periodic surface electrostatic field modulator;

FIG. 3 is an enlarged plan view of the portion III of FIG. 2, representing the detailed dimensions of the interdigital electrodes in the example;

FIG. 4 is an enlarged sectional view of the portion shown by arrows IV — IV of FIG. 2, representing the relation between the electrodes and the periodic surface electrostatic field in the crystal;

DESCRIPTION OF THE PREFERRED EMBODIMENTS

Figure 5:
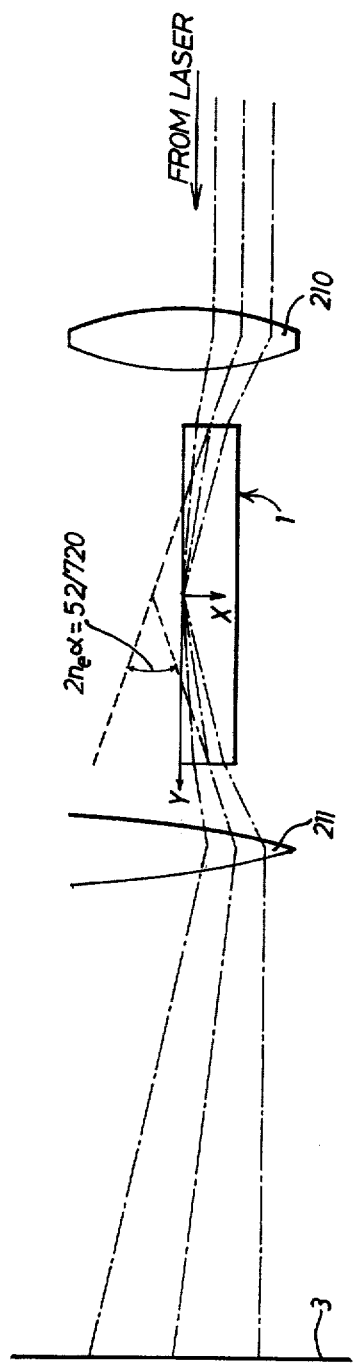
FIG. 5 is a schematic side view representing an example of the coupling scheme using the total-internal reflection from the electroded surface.

Referring to FIG. 1, fundamental functions in a general electrooptic diffraction modulator are explained in the following. In a parallelepiped electrooptic crystal of a modulation unit 1, a spatially periodic electrostatic field having a pitch $p$ in $z$-direction is produced. As viewed in the attached diagram in FIG. 1, this periodic electrostatic field has a sinusoidal variation of a pitch $p$ toward $z$-direction and exponential decay toward $x$-direction, $x$ being measured from the surface to the inside of the crystal. The periodic electrostatic field existing in the crystal causes a periodic variation of the refractive index, the deviation amount being $\delta n$ from the normal refractive index under no electrostatic field. In the case of the $3m$ electrooptic crystal, $\delta n$ is given as:

$$\delta n = (\tfrac{1}{2})n_e^3 r_{33} E(x, z),$$

provided the electromagnetic field has $E$ vector to $Z$-direction and $E(x, z)$ is taken to be $z$-component of the electrostatic field. It has sinusoidal variation of the pitch $p$ as shown in the attached diagram in FIG. 1. An electromagnetic incident beam of wavelength $\lambda$ and intensity I from a laser 2 is projected into the electrooptic crystal 10 toward $y$-direction. After propagated in a length $l$ through the portion of the electrooptic crystal 10, the phase of the incident beam receives imprint of spatial periodic variation as:

$$\phi = (2\pi/\lambda) \int_0^l \delta n \cdot ds.$$

It has also sinusoidal variation of pitch $p$ as shown in the attached diagram in FIG. 1.

As is easily understood in an analogy to the wave form analysis, a plane wave whose phase is spatially modulated with amplitude $\phi$ and spatial frequency $1/p$ is reconstructed by a superposition of spectral components having spatial frequency $m/p$ and power intensity $I \cdot J_m^2(\phi)$ where $m$ is zero or positive or negative integer. In this case a spatial frequency $m/p$ toward $z$-direction means the presence of a small $z$-component $m/p$ of the wave vector for the diffracted component beam wave. This means, in turn, the diffracted component wave has a direction of propagation inclined $(m/p)/(1/\lambda)$ to the original $y$-direction. $(1/\lambda)$ is a large $y$-component wave vector of the incident beam. This explains the relation given in Eq. (8) as for the directions of the diffracted components which are shown by arrows $I_o, I_1, I_2, \ldots I_m$ in FIG. 1. A slit 3 in FIG. 1 allows to pass through the only zero-th order component, $I_o = I \cdot J_o^2(\phi)$ which is used for the modulated output power.

Referring to FIGS. 2, 3 and 4, an example of the modulation unit is explained in the following. In FIG. 2, on a $y - z$ plane surface (at $x = 0$) of an electrooptic lithium tantalate crystal 10 formed is an interdigital electrodes, comprising opposite electrodes 11 and 12, which are engraved from a metal layer by the photolithographical method. A modulation voltage V is applied between the opposite electrodes 11 and 12. This gives rise to a periodic surface electrostatic field in the electrooptic crystal 10 subjacent the electroded surface $(x = 0)$. The effective area for the surface electrostatic field is $w$ in width and $l$ in length. In FIG. 3 are shown detailed dimensions of the opposite electrodes 11 and 12 in the portion III of FIG. 2. In this example the pair-pitch $p$ is 0.200 mm and space-to-electrode-width ratio $\delta$ is 4. In FIG. 4 is shown a section of the modulation unit 1 depicted by arrows IV — IV of FIG. 2. In the section depicted in FIG. 4 is electric line of force to impress the relation between the electrodes and the periodic surface field subjacent the electroded surface. As viewed in the FIG. 4, the electrostatic field configuration produced by the applied voltage V is periodic toward $z$-direction with the period $p$ subjacent the electroded surface. The electrostatic field is expanded in exponential-Fourier series satisfying the Laplace equation. Terms of this series expansion has spatial frequency $m/p$. Among these terms the fundamental one given in Eq. (10) is most important as far as the diffraction modulation is concerned.

EXAMPLE I

In FIG. 5, illustrated is an example of the coupling scheme for the incident electromagnetic beam to the periodic surface electrostatic field using the total-internal reflection from the electroded surface in accordance with the present invention. A coherent light beam having a diameter $w = 1$ mm incident of a cylindrical lens 210 having focal length $F_1 = 100$ mm. The axis of cylindricity of the lens 210 lies parallel to $z$-axis and its principal points lie approximately in a plane ($x = 0$) which is the extention of the electroded surface of the modulation unit 1. With this configuration, the incident electromagnetic beam is flattened as thin in cross-section and focuses at the electroded surface, provided the beam is directed substantially parallel to y-axis. The entrance surface ($x - z$ plane) of the modulation unit 1 lies perpendicular to $y$-axis. The modulation unit 1 is so positioned that the focal point of the lens 210 locates at the center of the length $l_e$ of the electrodes 11 and 12 in the modulation unit 1. The wave propagates in the crystal 10 in $y$-direction but with a slight angle $\alpha$ of inclination against the electroded surface. At the center position of the $y$-direction length of the crystal 10, the wave reaches the electroded surface and is totally reflected to propagate toward another $x - z$ plane as an exit surface which lies perpendicular to $y$-axis.

The output beams from the modulation unit 1 go into a convex lens 211 having a focal length $F_2 = 700$ mm. A slit 3 is located at a distance equal to the focal length $F_2$ from the lens 211. That is, the diffracted beam which is still parallel as seen in projection to the plane ($x = 0$) is focused at the slit 3 as vertically oblong image. The zero-th order diffracted component is permitted to pass through the slit 3. The inclination $\alpha$ is determined from the shift of a beam image at a screen located at 720 mm from the center of the modulation unit 1 at the instant of inserting the modulation unit. The shift is measured to be 52 mm and $\alpha$ is determined to be essentially 0.0166 radian from the relation $2n_e\alpha = 52/720$. The intersection length $l_i$ between the incident beam and the electroded surface of the modulation unit 1 is given as:

$$l_i = (F_1\lambda/\alpha w)(4/\pi) \tag{13}$$

On the other hand the true coupling length $l_c$ is given by a relation:

$$l_c = p/\pi\alpha \tag{14}$$

In an example, $l_i$ which is approximately 5 mm is greater than $l_c$ which is approximately 4 mm. The minimum necessary electroded length $l_e$ must be $l_i + (\frac{1}{2})l_c$ which is 7 mm in this example. However, $l_e$ of 8 mm is adopted in this example to make allowance of facilitating the adjustment of the position of the modulation unit. In this example, $S_1$ in Eq. (6b) and $S_2$ in Eg. (6c) are 3.9 and 6.0 respectively. The former contributes to make allowance for suppressing the leakage output from the diffracted component of the adjacent order. The latter contributes to make allowance for the mechanical stability of the beam alignment and of the positioning of the modulation unit 1.

Figure 6:
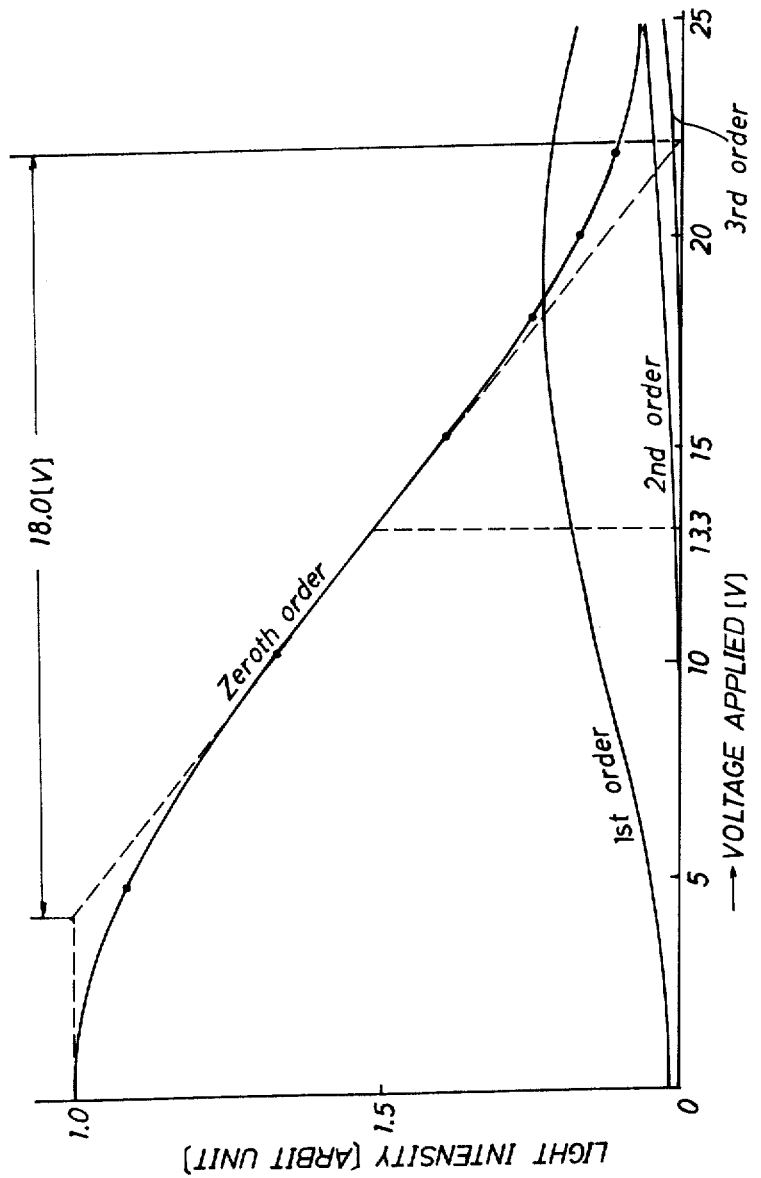
FIG. 6 is a graphical chart representing the modulation voltage affection on the output power of the each diffracted component.

Referring to FIG. 6, performance of the example of the present invention is explained of the following. FIG. 6 shows curves of $I_0(V)/I_0(O)$, $I_1(V)/I_0(O)$ and $I_2(V)/I_o(O)$ which are the output powers of the zero-th, first and second order of diffracted component relative to the unmodulated output of the zero-th order component. $(V_{eff})_{dif}$ is determined to be 18.0 volts from the tangent having the maximum slope in the curve of the zero-th order component. The electroded area $w \times l_e$ is (1 mm) × (8 mm). The electrode capacitance $(C)_{dif}$ is measured to be 7.0 pF. Accordingly, the modulation power for $f_c$ of 1 gigahertz and $\chi$ of 0.2 is 76 milliwatts. The optimum bias voltage for the continuous modulation is 13.3 volts.

EXAMPLE II

In a second example of the present invention, the same modulation unit 1 and the same coupling scheme but the slit 3 as that of the first example is used. With reference to FIG. 5 the slit 3 is now so positioned as to pass the first diffracted component through it at a distance equal to the focal length $F_2$ from the lens 211. With reference to FIG. 6, more specifically to the curve of the first diffracted component, performances of the second examples are evaluated in the following.

With zero bias voltage, a plused modulation voltage of 15 volts peak to peak gives rise to a modulation efficiency of 23 percent with an extinction ratio of 15:1. This example is suitable for pulse modulation of the beam.

EXAMPLE III

In a third example of the present invention, dimensions of the interdigital electrodes comprising opposite electrodes 11 and 12 are changed as $p = 0.300$ mm and $\delta = 1$. Using a y-bar of lithium tantalate crystal having length of 30 mm as the electooptic crystal 10 and a cylindrical lens having a focal length $F_1 = 45$ mm as the lens 210, $\alpha$ is reduced to 0.012 radian. $l_1$ in Eq. (13) and $l_c$ in Eg. (14) are given as 3 mm and 8 mm respectively. An electroded length $l_e$ of 12 mm that corresponds to $l_e = l_i = l_c$ is used.

With an electroded area $w \times l_e$ of (1.2 mm) × (12 mm) and with a change in $k'(\delta)$, the electrode capacitance $(C)_{dif}$ is changed as 14 pF. $(V_{eff})_{dif}$ for the zero-th diffracted component is reduced to 8.5 volts and the optimum bias voltage is changed as 6.2 volts. The modulation power for $f_c$ of 4 gigahertz and $\chi$ of 0.2 is 127 milliwatts in this example. A cylindrical lens having a focal length equal to that of lens 210, $F_2 = 45$ mm, is used for the lens 211. The lens 211 is positioned confocal to the lens 210. That is, the incident beam focused at the center of the electroded and a $l_e$ recolimated into a circular beam with a radius just equal to that of the incident beam from the laser 2. A circular aperture having a diameter of 1.6 mm and located at a distance of 1,000 mm from the lens 211 is used as the slit 3. On the plane of the slit 3 the separation of two diffracted beams of adjacent order is 2 mm. In this example, $S_1$ in Eq. (6b) and $S_2$ in Eq. 6c) are 3.1 and 4.7 respectively.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. An electrooptic modulator comprising:
   an electrooptic crystalline medium having a front side and rear side and a surface therebetween of a plane defined by rectangular coordinate first and second axes;
   electrodes provided on said surface to cause in said medium and subjacent said surface an electrostatic field which is spatially periodic in a direction of said first axis and uniform in a direction of said second axis;
   a first means to apply to said electrodes a voltage variable in accordance with a modulating signal; and
   a second means to couple onto the front side of said medium an incident beam of electromagnetic energy with flat-aligned planes toward a direction of said second axis and in such an angle range that said beam propagates in said medium to be totally reflected at an inside of said surface, said medium delivering modulated output beams from the rear side thereof.

2. An electrooptic modulator as claimed in claim 1 which further comprises:
   means to selectively pass one of said output beams.

3. An electrooptic modulator as claimed in claim 2, wherein said second means includes a laser light source to emit a coherent light beam and a cylindrical lens with axis parallel to said first axis to couple said beam into said medium so that the beam propagates in the medium subjacent said surface with an angle against said surface and focuses at substanially center position of said surface in said second direction, the angle being so determined that whole propagation path of the beam in the medium lies in the effective region of said electrostatic field.

4. The modulator of claim 1, wherein said electrooptic crystalline medium is lithium tantalate crystal.

5. The modulator of claim 1, wherein said electrodes are interdigital electrodes deposited on the surface of said electrooptic crystalline medium to produce the periodic electrostatic surface field.

6. The modulator of claim 2, wherein said means to selectively pass one of said output beams is a slit means to pass the zero-th order component of said output beams therethrough.

7. The modulator of claim 1, wherein said angle is 0.012 radian.

8. The modulator of claim 1, wherein said angle is 0.0166 radian.

* * * * *